United States Patent [19]

Kato et al.

[11] Patent Number: 5,047,378
[45] Date of Patent: Sep. 10, 1991

[54] EXHAUST GAS-PURIFYING CATALYST AND PROCESS FOR PURIFYING EXHAUST GASES

[75] Inventors: Yasuyoshi Kato; Nobue Teshima; Kunihiko Konishi; Toshiaki Matsuda, all of Kure, Japan

[73] Assignee: Babcock-Hitachi Kabushiki Kaisha, Tokyo, Japan

[21] Appl. No.: 422,697

[22] Filed: Oct. 17, 1989

[30] Foreign Application Priority Data

Oct. 18, 1988 [JP] Japan ................................ 63-262029

[51] Int. Cl.⁵ ............................................. B01J 29/06
[52] U.S. Cl. ......................................... 502/74; 502/60
[58] Field of Search .................... 502/60, 74; 423/239, 423/247

[56] References Cited

U.S. PATENT DOCUMENTS 4,331,644  5/1982  Ritscher .............................. 423/247
4,798,813  1/1989  Kato et al. .......................... 423/239

FOREIGN PATENT DOCUMENTS

| 219854 | 4/1987 | European Pat. Off. | 502/60 |
| 234441 | 9/1987 | European Pat. Off. | 502/60 |
| 59067 | 5/1976 | Japan | 502/60 |
| 232248 | 11/1985 | Japan | 502/60 |
| 232249 | 11/1985 | Japan | 502/60 |
| 3091142 | 4/1988 | Japan | 423/239 |

Primary Examiner—Carl F. Dees
Attorney, Agent, or Firm—Fay, Sharpe, Beall, Fagan, Minnich & McKee

[57] ABSTRACT

An exhaust gas-purifying catalyst capable of carrying out the CO-oxidizing reaction and the reduction reaction of $NO_x$ with $NH_3$ in the same reactor and with good efficiency, and a process for purifying exhaust gases using the catalyst are provided, which catalyst comprises Cu and/or Co supported by Zr oxide or Ti oxide mixed with a Cu-substituted type zeolite.

4 Claims, 5 Drawing Sheets

EXHAUST GAS-PURIFYING CATALYST AND PROCESS FOR PURIFYING EXHAUST GASES

BACKGROUND OF THE INVENTION

1. Field of the Invention

This invention relates to an exhaust gas-purifying catalyst and a process for purifying exhaust gases. More particularly it relates to an exhaust gas-purifying catalyst using a catalyst active to the reduction reaction of nitrogen oxides with ammonia and the oxidation reaction of carbon monoxide, and a process for purifying exhaust gases using the catalyst.

2. Description of the Related Art

In recent years, in various countries including the U.S.A., a composite electricity-generating system and an electric heat-feeding system having various engines such as gas turbine, diesel engine, etc. combined with a heat recovery boiler have been installed. Since these systems have very often been installed in populated districts, nitrogen oxides ($NO_x$) and carbon monoxide (CO) contained in exhaust gases from such systems have been a cause of environmental pollutions. Thus, exhaust gases-purifying systems as illustrated in FIG. 6 and FIG. 7 of the accompanying drawings have been employed to remove $NO_x$ and CO. In FIG. 6, an exhaust gas from gas turbine 1 is first contacted with CO-oxidizing catalyst 5a of a noble metal which oxidizes CO contained in the exhaust gas, followed by passing through super heater 2 and vaporizer 3 each connected to steam turbine 7, contacting with denitration catalyst 5b together with $NH_3$ sprayed from ammonia ($NH_3$)-spraying means 6 to remove $NO_x$ by reduction and being discharged via evaporator 4 from chimney 8 to the atmosphere. As CO-oxidizing catalyst 5a, catalysts of platinum (Pt), palladium (Pd) or the like supported on alumina have been used and as denitration catalyst 5b, denitration catalysts of titanium oxide containing vanadium (V), molybdenum (Mo), tungsten (W) or the like as an active component, similar to exhaust gas-denitration catalysts used for treating exhaust gases from boilers have been used.

According to the exhaust gas-purifying system of FIG. 6, since two reactors are required, there are drawbacks that the installation cost is high and the installation space is restricted. Further, since the spraying of $NH_3$ cannot be carried out in front of the CO-oxidizing catalyst of noble metals, there are problems that a sufficient space for mixing $NH_3$ with the exhaust gas cannot be provided between the $NH_3$-spraying means 6 and the denitration catalyst 5b and a high percentage denitration cannot be obtained; and an amount of unreacted $NH_3$ is discharged. Further, there is a drawback that catalysts of expensive noble metals are used in a large quantity.

FIG. 7 is directed to an exhaust gas-purifying system of prior art having the CO-oxidizing catalyst 5a and the denitration catalyst 5b provided in the same reactor. According to such a system, the noble metal catalyst 5a usually used as CO-oxidizing catalyst is also active to $NH_3$-oxidizing reaction, and oxidizes $NH_3$ in advance of the $NO_x$ reduction at the denitration catalyst 5b to generate $NO_x$; hence it is impossible to obtain a high percentage denitration. Further, since noble metal catalysts are used within a low temperature region, it is necessary to increase the quantity of the catalysts used; hence there is a drawback of high cost.

SUMMARY OF THE INVENTION

The object of the present invention is to provide an exhaust gas-purifying catalyst having solved the above-mentioned problems of the prior art and capable of carrying out the CO-oxidizing reaction and the reduction reaction of $NO_x$ with $NH_3$ in the same reactor with a high efficiency, and a process for purifying exhaust gases.

The present invention in a first aspect resides in:
an exhaust gas-purifying catalyst comprising copper (Cu) or cobalt (Co) supported on zirconium oxide ($ZrO_2$) or titanium oxide ($TiO_2$) (hereinafter referred to as a first component) mixed with a copper-substituted type zeolite (hereinafter referred to as a second component).

The present invention in a second aspect resides in:
a process for purifying exhaust gases which comprises removing nitrogen oxides and carbon monoxide contained in exhaust gases by catalytic reduction with ammonia in the presence of a catalyst comprising copper or cobalt supported on zirconium oxide or titanium oxide mixed with a copper-substituted type zeolite.

DETAILED DESCRIPTION OF PREFERRED EMBODIMENTS

Figure 1:
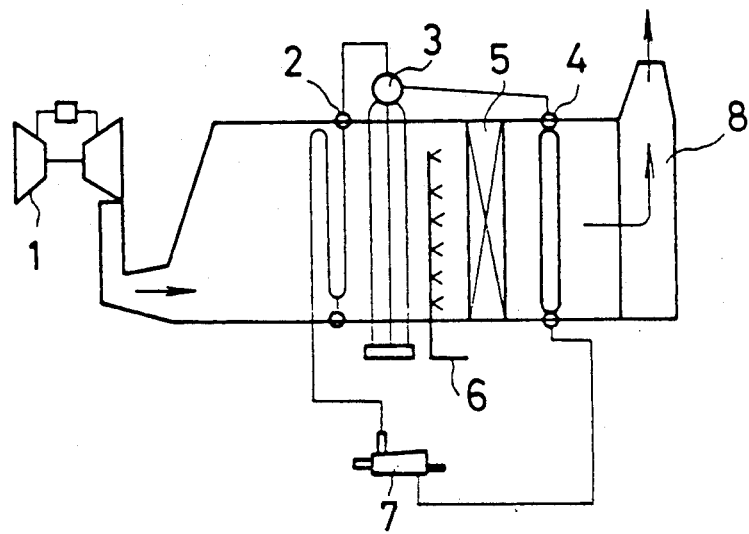
FIG. 1 shows a flow sheet of an exhaust gas-purifying system illustrating an embodiment of the present invention.
Figure 2:
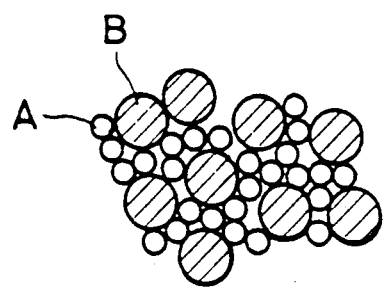
FIG. 2 shows a model view in crosssection of the structure of a catalyst of the present invention.

FIG. 2 shows a model view illustrating an enlarged section of the exhaust gas-purifying catalyst of the present invention. In this figure, the catalyst of the present invention is in a state where particles of a first component A of $ZrO_2$ or $TiO_2$ having supported Cu and/or Co and particles of a second component (B) of Cu-substituted zeolite are physically mixed together.

The $ZrO_2$ or $TiO_2$ catalyst having supported Cu and/or Co as a first component promotes oxidation of CO contained in exhaust gases according to the following equation (1):

$$CO + \tfrac{1}{2}O_2 \rightarrow CO_2 \tag{1}$$

and at the same time a portion of NO contained in exhaust gases is oxidized according the equation (2) to form $NO_2$:

$$NO + \tfrac{1}{2}O_2 \rightarrow NO_2 \tag{2}$$

The formed $NO_2$ and remaining NO reacts with $NH_3$ adsorbed onto the Cu-substituted zeolite as a second component having a strong solid acidity according to the following equation (3) to form $N_2$:

$$NO + NO_2 + 2NH_3 \rightarrow 2N_2 + 3H_2O \tag{3}$$

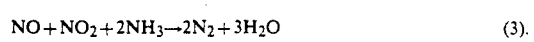

Since the reaction of the equation (3) is far faster than conventional denitration reaction expressed by the following equation (4), NH₃ is very rapidly consumed according to the reaction of the equation (3):

$$NO + NH_3 + \tfrac{1}{4}O_2 \rightarrow N_2 + 3/2 H_2O \quad (4).$$

Thus, when the above first component is singly used, it oxidizes NH₃ to form NO$_x$ and thereby reduce the percentage denitration, but when it is used in admixture with the Cu-substituted zeolite as the second component, adsorption of NH₃ onto the zeolite is prevailed and almost no oxidization reaction of NH₃ by the first component occurs; hence it is possible to carry out the denitration reaction with a high efficiency.

Thus, it is possible to remove CO and NO$_x$ with a good efficiency using a less quantity of catalyst than that of conventional catalysts and using a single mixed catalyst in the same reactor.

The first component used in the present invention can be prepared by kneading a salt of Cu or Co such as nitrate, acetate, etc. thereof together with zirconium hydroxide, metatitanic acid, zirconium oxide, etc., or by coprecipitating from a mixed solution of a salt of Cu or Co with a soluble Zr or Ti salt such as Zr or Ti sulfate, oxynitrate, etc. These compositions are preferred to be calcined at 400° to 600° C., then ground so that the proportion of powder of 1 μm or smaller can occupy 50% or more for use.

Atomic ratio of Cu and/or Co supported by ZrO₂ or TiO₂ (Cu and/or Co/Zr or Ti) is preferable in the range of 20/80 to 1/99, more preferably in the range of 10/90 to 3/97.

The second component used in the present invention is prepared by immersing powder of about 1 to 10 m of hydrogen type mordenite, clinoptilolite, erionite, Y type zeolite, etc., and besides, Na or Ca type zeolite in a Cu salt aqueous solution, or by kneading them together with the solution, followed if necessary, by water, washing, drying and calcining.

Next, the above first component and second component are kept in a physically mixed state to be molded or coated by means of roller press, wet molding, wash coating, etc. This physically mixed state means a state where the first component and the second component can be respectively discriminated by a usual measurement means such as X-rays diffraction, electronic or optical microscope, etc. The proportion by weight of the first component/ the second component is preferably in the range of 5/95 to 50/50, more preferably 10/90 to 40/60. When the proportion of the first component is too large, decomposition of NH₃ is concurred to make it impossible to obtain a high percentage denitration. On the contrary, when the proportion of the first component is too small, it is impossible to obtain a higher activity in oxydizing Co. In the molding, where the two components are mixed, this mixing is preferred to be a physical mixing as much as possible, and mixing or molding by which vigorous milling occurs is undesirable. In the molding, it is possible to use an organic or inorganic binder, etc. In the coating, the catalyst composition may be slurried and coated onto a ceramic honeycomb, a metal substrate, etc.

The present invention will be described in more detail by way of Examples.

EXAMPLE 1

Powder of zirconium hydroxide (made by Kishida Chemical Co., Ltd., ZrO₂ 90%) (35 g) was added to an aqueous solution of copper nitrate (Cu(NO₃)₂ 3H₂O) (6.0 g) dissolved in water (50 g), followed by vaporization to dryness on a sand bath. The resulting solids were calcined at 500° C. for 2 hours in air and ground into powder having an average particle diameter of 1 μm to prepare a first component.

Copper acetate (Cu(CH₃COO)₂.2H₂O) (2.8 g) was dissolved in water (100 g) and a hydrogen type mordenite having an average particle diameter of about 10 μm (30 g) was added to the solution, followed by vaporization to dryness on a sand bath to prepare a Cu-substituted zeolite, drying it at 180° C. for 2 hours and calcining at 500° C. for 2 hours in air to prepare a second component.

The first component (3 g) and the second component (7 g) were dry-mixed in a mortar, followed by molding the mixture into a rod having a diameter of 13 mm and a length of 5 mm by means of a hydraulic press, grinding the rod into powder of 10 to 20 meshes to obtain an exhaust gas-purifying catalyst of the present invention.

COMPARATIVE EXAMPLES 1 and 2

The first component and the second component obtained in Example 1 were respectively singly molded in the same manner as in Example 1 to prepare catalysts.

EXAMPLE 2

Example 1 was repeated except that zirconium hydroxide of Example 1 was replaced by metatitanic acid powder (SO₄ content 0.2%, TiO₂ content: 80%) (39.4 g) to prepare a catalyst.

EXAMPLE 3

Example 1 was repeated except that copper nitrate of Example 1 was replaced by cobalt acetate (Co(NH₃)₂.6-H₂O) (7.8 g) to prepare a catalyst.

EXAMPLE 4

Example 1 was repeated except that the hydrogen type mordenite was replaced by Na type Y zeolite to prepare a catalyst.

COMPARATIVE EXAMPLES 3-5

The first components of Examples 2 and 3 and the second component of Example 4 were respectively singly molded in the same manner as in Example 1 to prepare catalysts.

Test example 1

The respective one mls of the catalysts obtained in Example 2 and Comparative examples 1 and 2 were subjected to examination of CO oxidaton activity and NO reduction activity with NH₃ under the conditions shown in Table 1. The results are shown in FIG. 3.

TABLE 1

| | |
|---|---|
| CO | 200 ppm |
| NO | 200 ppm |
| NH₃ | 240 ppm |
| O₂ | 10% |
| H₂O | 6% |
| CO₂ | 6% |
| N₂ | Balance |
| Temperature | 250 ~ 400° C. |
| SV | 184,000 h⁻¹ |

Figure 3:
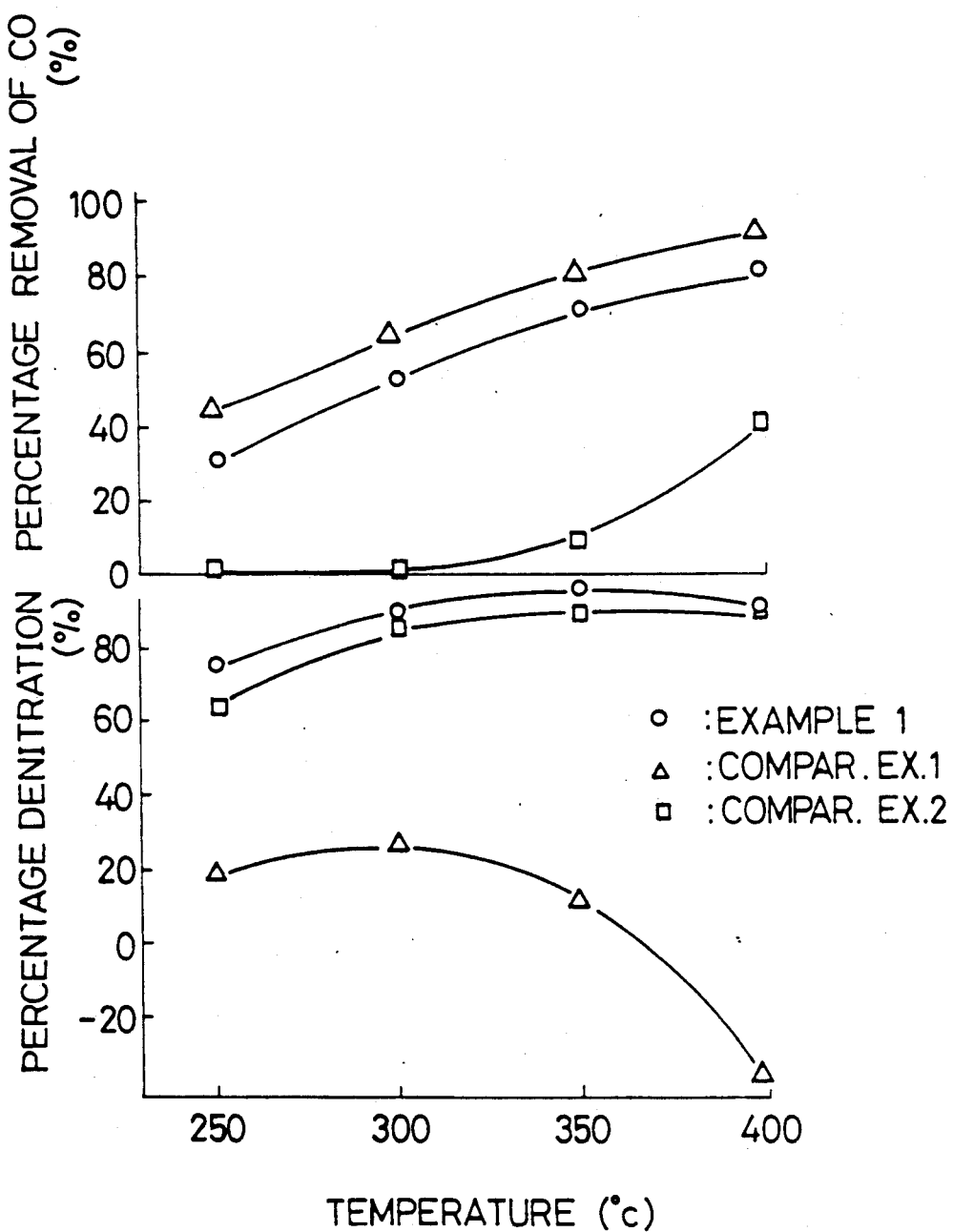
FIGS. 3 and 4 each show a chart illustrating the experimental results of Example 1 and Comparative examples 1 and 2.

As seen from FIG. 3, in the case of Comparative example 1 directed to single use of the first component, the percentage removal of CO is high, but the denitration reaction scarcely advances; $NO_x$ occurs by $NH_3$ oxidation in a high temperature region; and the percentage denitration is lowered. Further, in the case of Comparative example 2 directed to single use of the second component, the percentage denitration is high, but the percentage removal of CO is low. Whereas, the catalyst of Example 1 of the present invention has superior properties that the percentage removal of CO is not only high, but also the percentage denitration is higher than that of Comparative example 2.

Test example 2

Figure 4:
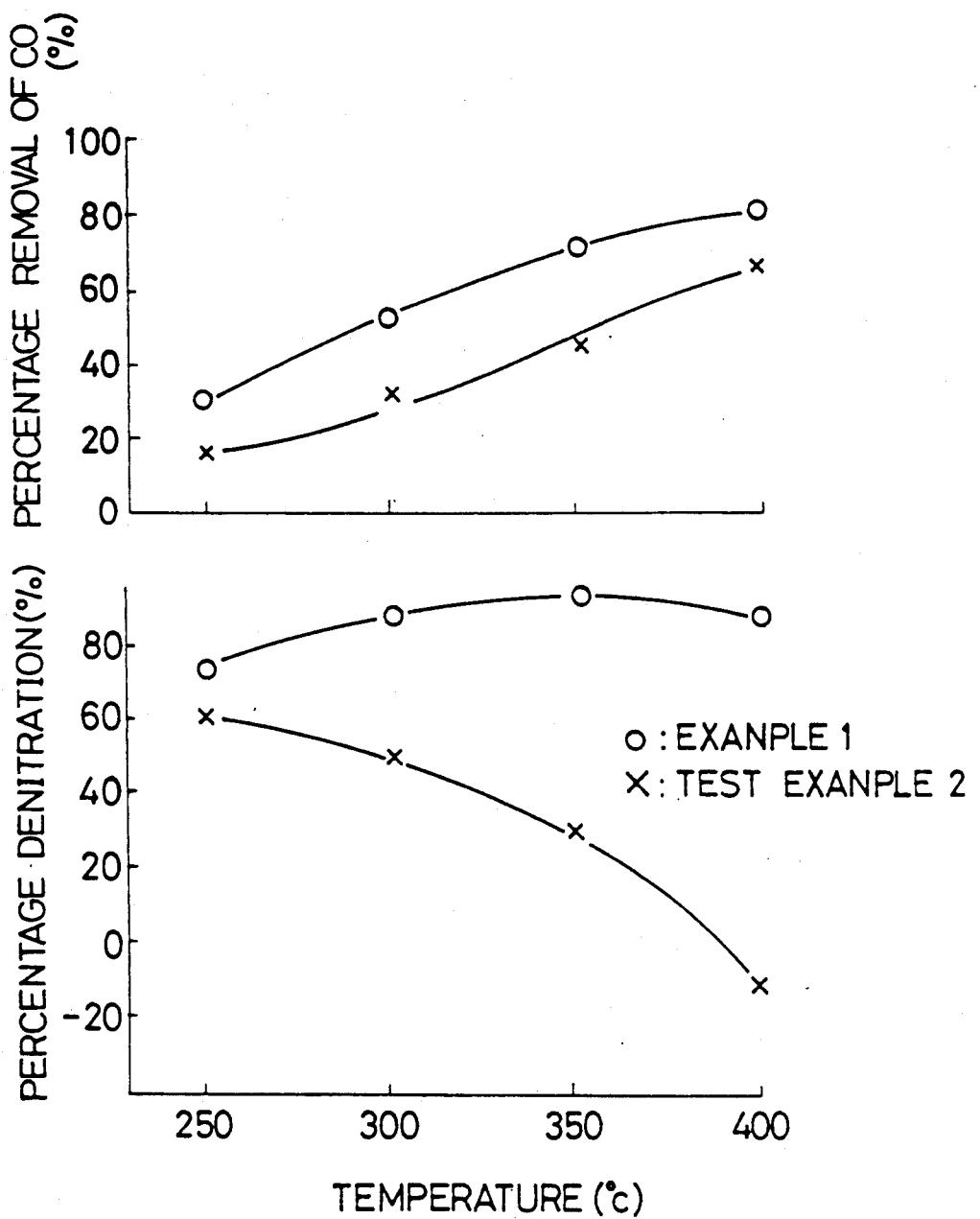
Figure 7:
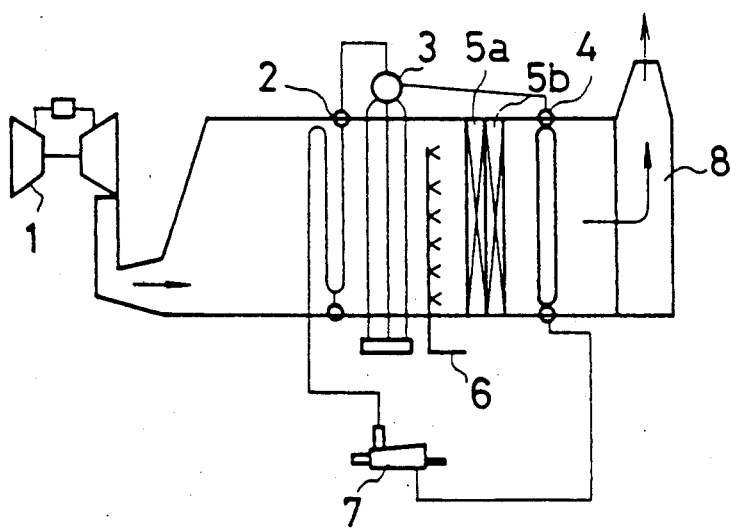

Further, employing a system simulating that of FIG. 7, the catalyst of Comparative example 1 (0.3 ml) was filled in the upstream part of the system and the catalyst of Comparative example 2 (0.7 ml) was filled in the downstream part to carry out a reaction. The results are shown in FIG. 4, in comparison with the case where the catalyst of Example 1 was used. In FIG. 4, symbol o indicates the results of Example 1 and symbol × indicates the results of the simulation test carried out by the system of FIG. 7. As seen from FIG. 4, the results of the simulation test are far inferior in both the percentage removal of CO and the percentage denitration to those of Example 1.

Test example 3

With the catalysts of Examples 1-4 and Comparative examples 1-5, the percentage removal of CO and the percentage denitration under the conditions shown in Table 1 and at 350° C. were measured. The results are collectively shown in Table 2. As seen from Table 2, any of the catalysts of Examples were superior in both the percentage removal of CO and the percentage denitration, whereas the catalysts of Comparative examples are far inferior in the percentage removal of CO or the percentage denitration.

TABLE 2

| Catalyst | Composition 1st component | Composition 2nd component | Percentage removal of CO (%) | Percentage denitration (%) |
|---|---|---|---|---|
| Example 1 | Cu/ZrO$_2$ | Cu—H type mordenite | 69 | 96 |
| Example 2 | Cu/TiO$_2$ | Cu—H type mordenite | 62 | 93 |
| Example 3 | Co/ZrO$_2$ | Cu—H type mordenite | 58 | 94 |
| Example 4 | Cu/ZrO$_2$ | Cu—Y type mordenite | 67 | 97 |
| Comp. ex. 1 | Cu/ZrO$_2$ | — | 79 | 14 |
| Comp. ex. 2 | — | Cu—H type mordenite | 16 | 91 |
| Comp. ex. 3 | Cu/TiO$_2$ | — | 65 | 11 |
| Comp. ex. 4 | Co/ZrO$_2$ | — | 79 | −3 |
| Comp. ex. 5 | — | Cu—Y type Mordenite | 30 | 91 |

As seen from the foregoing, the catalyst of the present invention in a physically mixed state makes it possible to simultaneously carry out the CO removal and the denitration reaction.

EXAMPLE 5

The first component (10 g) and the powder of the second component (10 g) of Example 1 were mixed with a colloidal silica sol (30 g) containing 30% by weight of $SiO_2$ (Snowtex-O, trademark of Nissan Kagaku Co., Ltd.) to obtain a slurry-form substance. In this slurry was immersed a SUS 304 plate of 0.2 mm thick × 100 mm × 10 mm subjected to flame spraying with metal aluminum at a rate of 100 g/m$^2$, to coat the plate with the slurry, followed by drying the material and calcining at 500° C. for 2 hours to obtain a catalyst. The quantity of the catalyst components supported was 250 g/m$^2$.

This catalyst was cut into test pieces each of 20 mm × 100 mm, and with one of the test pieces, the percentage removal of CO and the percentage denitration were measured under conditions of the gas composition in Table 1 and a gas flow quantity of 184 l/h. The results are shown in FIG. 5.

COMPARATIVE EXAMPLE 6

A Ti/Mo/V catalyst (Ti/Mo/V = 91/5/4 in atomic ratio) prepared according to the process disclosed in Japanese patent application laid-open No. Sho 50-168281/1975 was coated in the same manner as in Example 5 and the percentage denitration and the percentage removal of CO were measured. The results are shown in FIG. 5.

Figure 5:
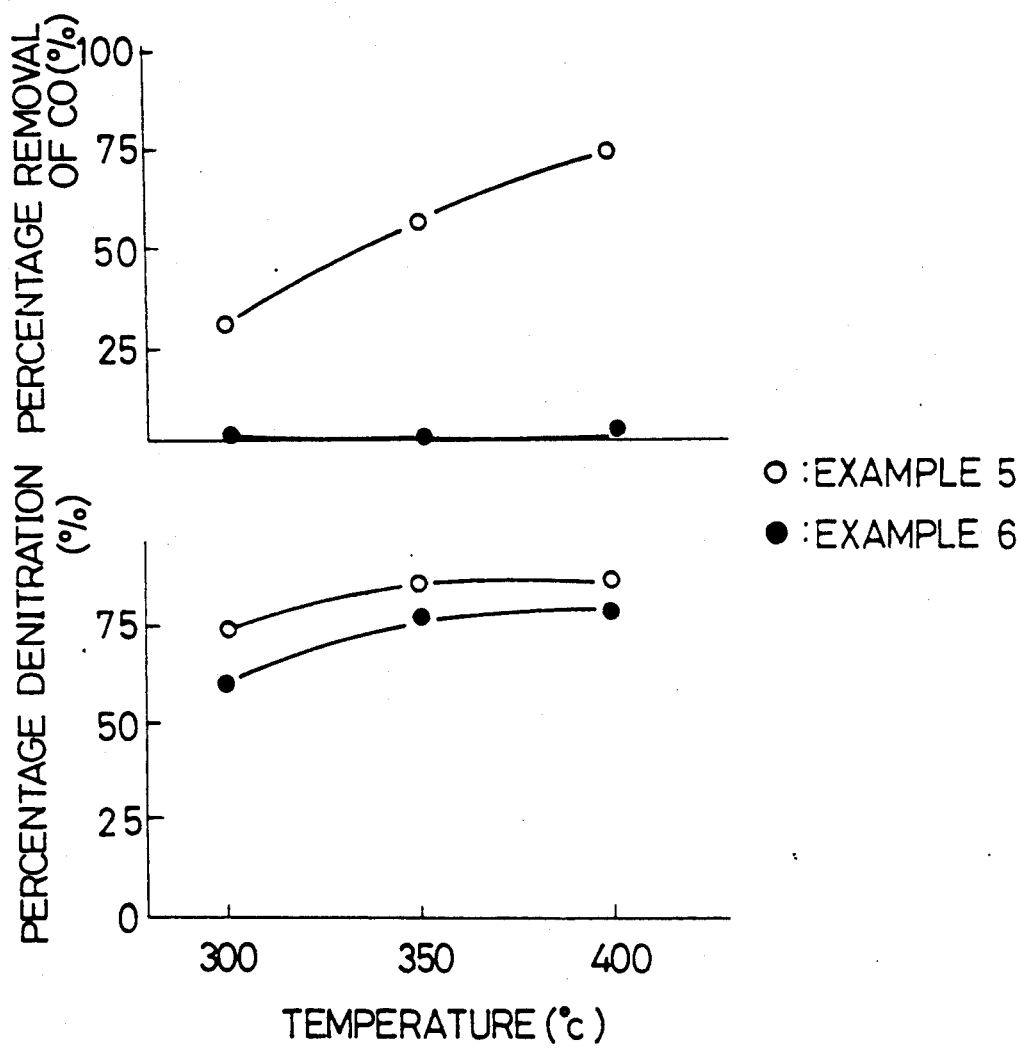
FIG. 5 shows a chart illustrating the experimental results of Example 5 and Comparative example 6.
Figure 6:
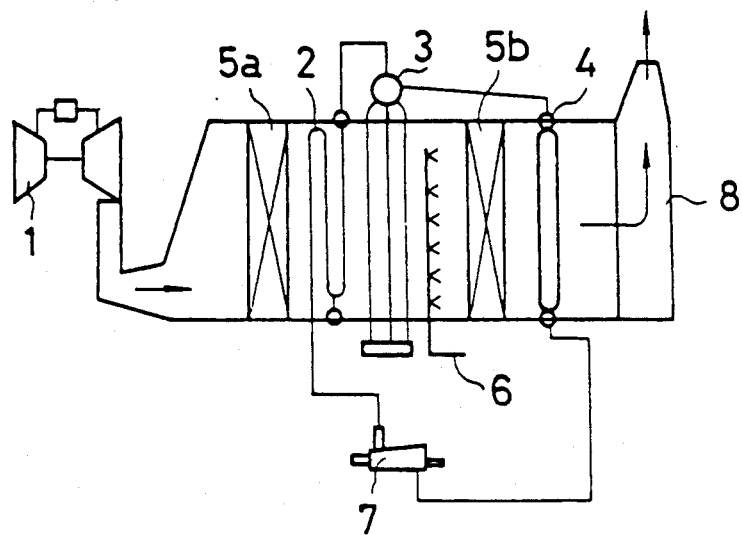
FIGS. 6 and 7 each show a flow sheet of exhaust gas-purifying system of the prior art.

As seen from FIG. 5, the catalyst of Example 5 is also superior not only in the percentage denitration, but also in the percentage removal of CO to conventional titanium oxide catalyst of Comparative example 6.

According to the present invention, since it is possible to carry out the CO oxidation reaction and the $NO_x$ reduction reaction with $NH_3$ in the same mixed catalyst, it is possible to simultaneously carry out the CO removal and the denitration in the same reactor. Thus, the catalyst of the present invention is useful particularly for exhaust gas-treating systems such as composite electricity-generating systems.

What we claim is:

1. An exhaust gas-purifying catalyst for reducing nitrogen oxides and oxidizing carbon monoxide, comprising:
   a first component including copper and/or cobalt supported by zirconium oxide or titanium oxide, an atomic ratio of said copper and/or cobalt to said zirconium oxide or titanium oxide being in the range of 20/80 to 1/99; and
   a second component including a copper-substituted type zeolite, a proportion by weight of said first component to said second component being in the range of 5/95 to 50/50.

2. An exhaust gas-purifying catalyst for reducing nitrogen oxides and oxidizing carbon monoxide according to claim 1, wherein said first component including copper and/or cobalt supported by zirconium oxide or titanium oxide is prepared bu kneading salts of Cu and/or Co together with zirconium hydroxide, metatitanic acid or zirconium oxide, or by coprecipitating from a mixed solution of a salts of Cu and/or Co with a soluble zirconium or titanium salt.

3. An exhaust gas-purifying catalyst for reducing nitrogen oxides and oxidizing carbon monoxide according to claim 1, wherein said second component including copper-substituted type zeolite is prepared by immersing powder of hydrogen type zeolite in a copper salt aqueous solution, or by kneading it together with the solution.

4. An exhaust gas-purifying catalyst for reducing nitrogen oxides and oxidizing carbon monoxide according to claim 1, wherein said first component and said second component are in a physically mixed state in the catalyst.

* * * * *